Sept. 23, 1952     W. A. BRINKHURST     2,611,280
SCREW FEED MECHANISM

Filed July 3, 1948     2 SHEETS—SHEET 1

INVENTOR.
WILLIAM A. BRINKHURST
BY
Reynolds Beach
ATTORNEYS

Sept. 23, 1952     W. A. BRINKHURST     2,611,280
SCREW FEED MECHANISM
Filed July 3, 1948     2 SHEETS—SHEET 2
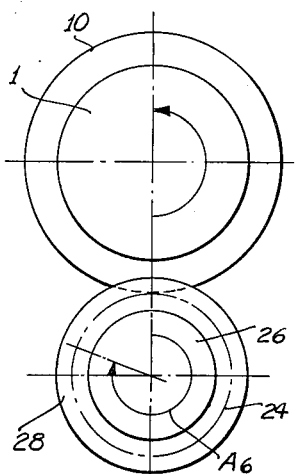
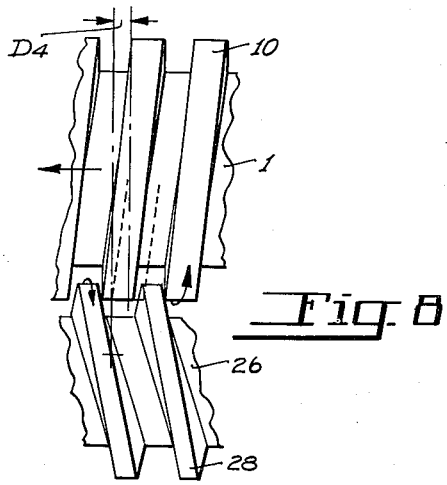
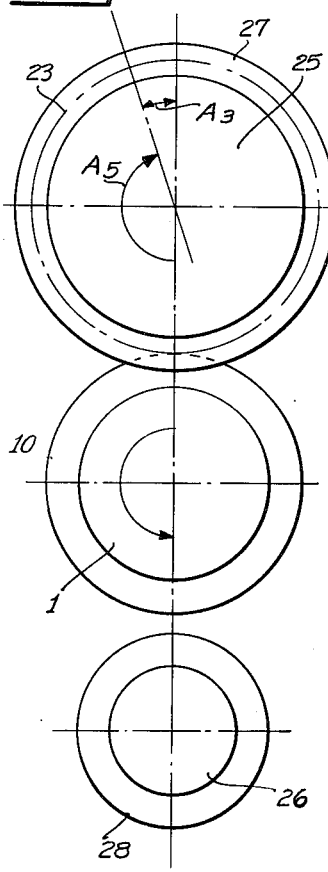
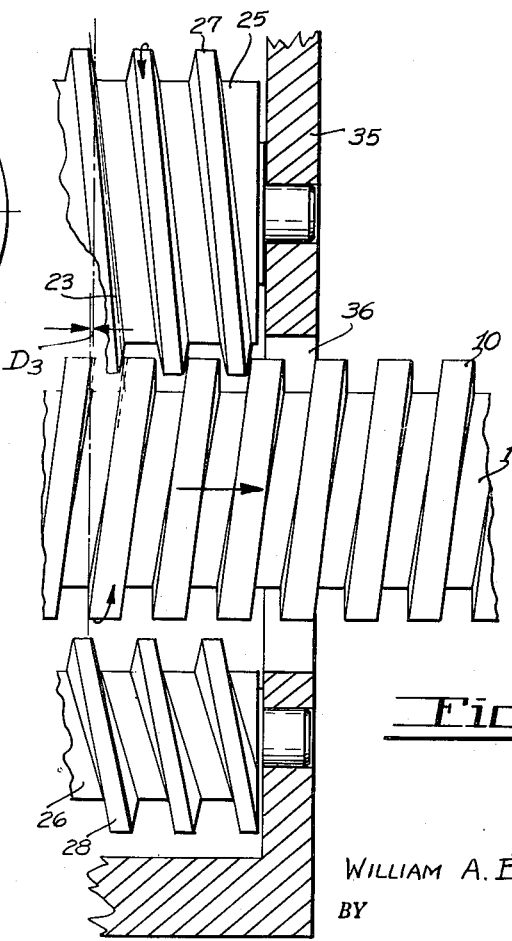
INVENTOR.
WILLIAM A. BRINKHURST
BY
Reynolds & Beach
ATTORNEYS Patented Sept. 23, 1952

2,611,280

UNITED STATES PATENT OFFICE 2,611,280

SCREW FEED MECHANISM

William A. Brinkhurst, Vancouver,
British Columbia, Canada

Application July 3, 1948, Serial No. 36,842

10 Claims. (Cl. 74—424.8)

In certain mechanical installations it is desirable to rotate and to continue rotation of a shaft in a single rotative sense, and to effect simultaneously controlled axial displacement of the rotative shaft in a single sense. The axial displacement should frequently vary by infinite increments, from zero to the maximum, hence is not necessarily continuous. Furthermore, in such installations it is likewise desirable at times while continuing the rotation of the rotative shaft in the same rotative sense as before, to effect axial displacement thereof in the opposite axial sense.

An example of such an installation is a rock drill, wherein the rotative drill shaft must be advanced into the work usually at an extremely low axial rate of advance and by infinitely variable increments, and wherein it is desirable from time to time to effect withdrawal of the drill shaft without interrupting its rotation in the same rotative sense, and then to resume its advance into the work. Where such withdrawals and return of the drill shaft are made the unloaded axial displacement of the shaft, positive or negative, is desirable at a rate many times that of its normal rate of advance under load into the drill bore, yet complicated transmission gearing and the like is undesirable, and the system must be simple, and must operate without interruption to the rotative sense and rate of rotation of the drill shaft.

The present invention is designed to provide a simple, rugged, dependable transmission mechanism adapted to the accomplishment of the above ends. Its use is by no means limited to mining drills, for it is useful, for example, in automatic feed mechanism for thread-cutting machines, where the rate of displacement remains constant.

The invention, then, is to be understood as pertaining in its broad phases to a transmission of the type hereinafter described, and built according to the principles hereinafter set forth, and as illustrated by the typical embodiments in the drawing, and of the nature hereinafter more fully defined in the claims.

Figure 5 is a diagrammatic end view, and Figure 6 is a side elevational view, illustrating a somewhat modified arrangement, with parts in one position of adjustment; and Figure 7 is a view similar to Figure 5, and Figure 8 a view similar to Figure 6, showing the same form with certain parts omitted, and with those remaining in a different position of adjustment.

Figure 1:
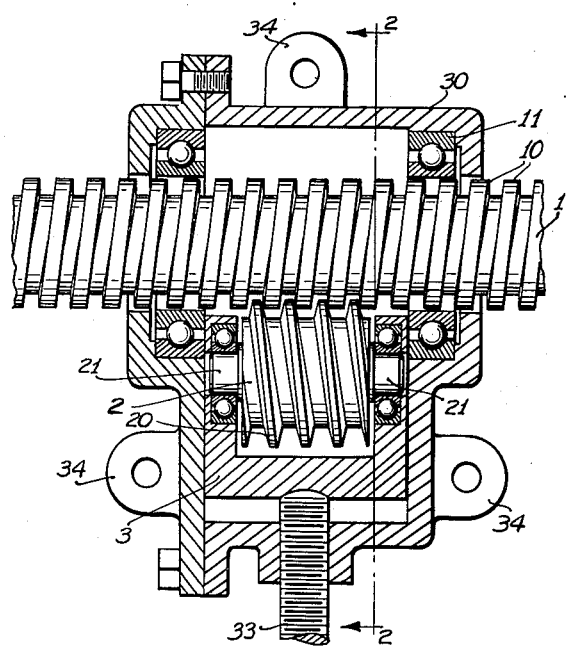
Figure 1 is, in general, an axial sectional view through a typical transmission embodying my invention, showing parts in a generally neutral position, that is, a position corresponding to zero axial advance.
Figure 2:
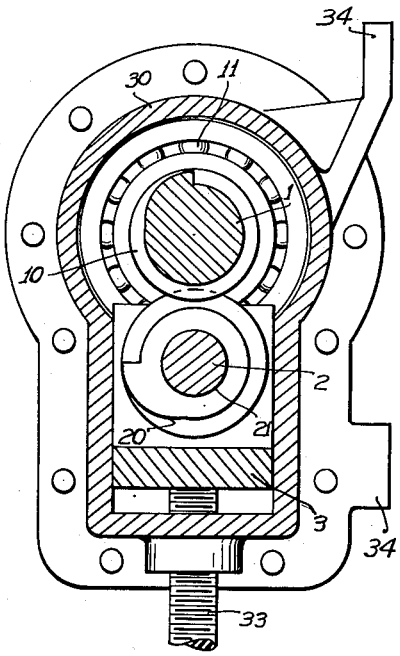
Figure 2 is a transverse section through the same substantially along the line 2—2 of Figure 1.

The present application is related to my application now on file in the Patent Office entitled Screw Feeds, Serial No. 550,811, filed August 23, 1944. That application illustrates and claims a specific form of the invention which differs from the specific form herein illustrated.

The shaft 1 with its thread 10 may be assumed, for purposes of this description, to be the rotative member, which is also axially displaceable. To these ends it is supported in bearings 11 in a housing 30 which journal it for rotation and which permit its axial displacement through the bearings. The means for rotating the shaft are not shown but may be any that are found suitable. The use of coarse, square or nearly square threads, as shown, simplifies their formation and makes for ruggedness and dependability, but also requires the use of a coarse pitch, which is not ordinarily consistent with advance by small increments.

Alongside the shaft 1 and in axial parallelism therewith, in the form of Figures 1 to 4, inclusive, is a threaded rotative member, tangent screw, or worm 2 having the threads 20. This worm is rotatively supported, by the stub shafts 21, in a yoke 3 which is slidably supported in the housing 30 in such manner that the worm 2 resists axial displacement, and hence by reaction can effect axial displacement of the shaft 1 relative to the housing, yet the worm may rotate freely, and in at least one position of adjustment, in a manner to be described hereafter, will cancel out any axial thrust on the shaft 1, or in another position will even produce reverse axial thrust on the shaft, all as the latter rotates in one direction. The yoke 3, hence the worm 2, is adjustable towards and from the shaft 1 so as to vary the spacing of the axes of the worm and shaft respectively. The means of adjustment may be any that are suitable, and are typified by the adjusting screw 33 threaded in the housing 30. By these or equivalent adjusting means the threads 20 of the threaded member or worm may be brought more or less deeply into engagement with the threads 10 of the screw 1. A single worm screw only should be employed.

Before proceeding to a description of the operation of the device it is desired to point out certain peculiarities in the threads, particularly of the threads 20, and in their relationship to the threads 10. The threads 10 are shown as square threads, and the threads 20 as tapered threads. This is not an essential relationship, but may be reversed, or both may be tapered. If we denominate the threads 10 as the standard the pitch distance or lead of these threads 10 may be taken as unity, and though the threads 20 are different in diametral and circumferential distances, as will shortly be pointed out, their pitch distance or lead is identical with that of the threads 10. Since the threads 20 are not square threads, in the form shown, but tapered threads, the point of engagement or effective pitch circle $P_1$ of the square threads 10 is always at their extreme circumference $C_1$, whereas the effective pitch circle $P_v$ of the threads 20 is wherever the effective pitch circle of the threads 10 contacts the tapered side walls of the threads 20, and this may be at any point, from just inside the extreme circumference $C_2$ of the threads 20, to the extreme root at $c_2$ of the threads 20, depending upon the adjustment towards and from one another of the shaft 1 and worm 2. The relationship described constitutes an effective way of achieving the results desired, yet it is the result which is the important thing, and any equivalent way of achieving like results may be employed, within the intent of this invention.

Let us assume, as shown in Figures 1 to 4, that the worm 2 at circle $c_2$ at the root of its threads 20 is of somewhat greater diameter $d_2$ than the diameter $d_1$ of the shaft 1 at circle $c_1$ at the root of its threads 10, but the diameter $d_2$ of the worm 2 at the circle $c_2$ at the root of its threads 20 is somewhat less than the diameter $D_1$ across the tip of the threads 10 of the shaft 1. The threads 20, at their tip, are greater in diameter $d_1$ than the diameter $D_1$ at the tip of the threads 10. Somewhat intermediate the root and the tip of the threads 20 can be located a circle 22 which has a circumference $P_v$ equal to the circumference $P_1$ of the tip of the threads 10. Inspection of Figure 3 and of its companion Figure 4 should make this clear. Since the effective pitch circle $P_1$ of the threads 10 is, by hypothesis, always their extreme circumference $C_1$, and since there is an equal circle 22 or $P_v$ generally located midway between the root circumference $c_2$ and the extreme outer or tip circumference $C_2$ of the threads 20, it follows that there is a position of adjustment between the shaft 1 and worm 2 wherein the threads 20 of the worm or threaded member 2 are engaged with the threads 10 about this circle 22 or $P_v$. Now if the shaft 1 rotates through 180°, as indicated by the arrow A1 in Figure 3, the engagement of the threads 10 with the threads 20 along the equal circle 22 will effect reverse rotation of the worm 2, also through precisely 180°, as indicated by the arrow A2. If the worm 2 were held against rotation, it is obvious that 180° rotation of the shaft 1, in the manner just described, would have displaced the shaft axially by half the pitch distance. The worm 2, however, is not held against rotation, but is free to rotate, and so when engaged in the manner shown in Figures 3 and 4, 180° of rotation of the shaft 1 in one sense will have rotated the worm 2 precisely 180° in the opposite sense, thereby exactly cancelling out any end thrust on the shaft 1. This is the position of adjustment corresponding to zero advance.

Figures 3, 4:
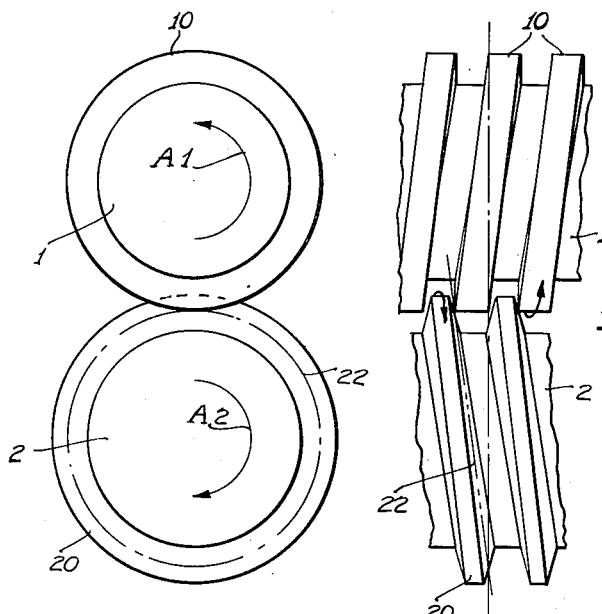
Figure 3 is a diagrammatic end elevation of the relationship between the threads of the shaft and the worm.
Figure 4 is a similar diagrammatic view in elevation. In both views the position of adjustment is substantially that of zero advance.

Reasoning as above, it becomes clear that if the worm or threaded member 2 is adjusted slightly farther away from the axis of the shaft 1 than the position shown in Figures 3 and 4, the effective pitch circle $P_1$ of the thread 10, which remains at its outermost circumference $C_1$, will engage the threads 20 about a pitch circle $P_v$ which is larger than the circle 22; its circumferential distance is also longer. 180° of rotation of the shaft 10, with parts in the latter position of adjustment, will not therefore rotate the worm 2 through 180°, but through some lesser angular extent, wherefore the reverse rotation of the worm does not completely cancel out the end thrust upon the shaft 1, but effects axial displacement of the shaft 1 by a distance which bears such relation to one-half the pitch distance of the threads 10 as the angular extent of rotation of the worm bears to 180°. This may be arbitrarily denominated the positive sense of axial displacement, and it will be clear that by sufficient fineness of adjustment of the spacing between the axes of the worm and of the shaft this positive axial displacement may be extremely small in amount, or may be a fairly large amount, depending upon the distance between the neutral pitch circle 22 and the extreme outer circumference $C_2$ of the threads 20.

Following the same reasoning farther, it is obvious that the worm 2 may be adjusted to cause its axis to approach somewhat closer to the axis of the shaft 1 than the position of zero displacement which is shown in Figures 3 and 4. Now the effective pitch circle $P_1$ of the threads 10, which still is their outer circumference $C_1$, engages the threads 20 about an effective pitch circle $P_v$ which is smaller in diameter and circumference than the pitch circle $P_1$ of the threads of the shaft. Rotation of the shaft through 180° now rotates the worm 2 through an angular distance in excess of 180°. The worm now produces a reverse thrust axially of the shaft 1, and instead of displacing the shaft in the positive sense the shaft is displaced in what may be termed the negative sense. It follows that a single worm or threaded member, bearing the relationship to the threads of the shaft described above, may be employed to effect axial displacement of a threaded shaft, while rotating always in a single rotative sense, in a positive or in a negative axial sense, and by varying increments in either axial sense from the position of zero displacement. By control of the spacing between the axes of worm 2 and shaft 1 it is possible to vary the axial advance of the shaft 1 by any increment desired, to return it to zero, to reverse its sense of displacement, or by setting the spacing between the worm and shaft at a fixed spacing, the shaft 1 may be given any fixed rate of axial displacement, when that is desirable.

It will be clear that the term "pitch circle" as used in the above explanation is a somewhat arbitrary term. It will be observed that in this embodiment of the invention the two pitch circles are exteriorly tangent one to another. In the arrangement of my copending application, Serial No. 550,811, wherein the threaded member surrounds the shaft, the pitch circles are interiorly tangent; that is to say, one pitch circle is and must of necessity always be considerably greater in size than the other, yet the two are always tangent at some one point whenever they are interengaged. Because one such pitch circle must be appreciably larger than the other, the axial displacement must always be in one sense, and can not be reversed as described above with reference to the present embodiment, yet in other respects the two embodiments are alike in principle.

It will be observed that the conditions stated above, namely, that the pitch distance or lead of each of the threads 10 and 20 is the same, yet that the outside circumference of the threads 10 and 20 is different, prescribes that the pitch angle of the threads 10 and 20 will not be the same, but different. Nevertheless so long as the pitch distance or lead is the same the device will operate and will be effective, and bearing is thereby obtained along a multiplicity of points on the threads 20, making the device sufficiently rugged to transmit a large amount of thrust axially to effect displacement of the shaft 1, and to afford a very considerable mechanical advantage. Of course, were the shaft 1 held against axial displacement, and the casing 30 were free to move, instead of being anchored as it is at the points of support at 34, then the housing 30 would be displaced axially by the thrust produced as explained above.

Similar principles may be incorporated in an embodiment shown in Figures 5 to 8, inclusive, wherein the slide 35, slotted at 36 to span and move transversely with relation to the shaft 1, supports two worms or threaded members, each corresponding to the worm 2, but designated, to distinguish them, by the numerals 25 and 26, both journaled in the yoke or slide 35. The threads 27 of the worm 25 are of the same diameter at their root as the extreme outer diameter of the threads 10, and at the tip of the threads 27 they are, of course, larger than the threads 10. On the other hand, the threads 28 of the worm 26 are only as large at their outer tip as the root diameter of the threads 10, and toward the root of the threads 28 they are smaller than the outside diameter of the threads 10. The two worms 25 and 26 are adjustable simultaneously in the arrangement shown, and are spaced far enough apart that engagement of the two worms simultaneously with the threads 10 is impossible. As shown in Figures 5 and 6, the threads 27 may engage the threads 10 about a pitch circle 23 which is larger than the effective pitch diameter of the threads 10, with the result that the worm 25 does not turn by as much as 180° upon 180° rotation of the shaft 1, but through a lesser angle represented by the arrow A5. By the ratio of the angular amount represented at A3 to 180°, as related to one-half the pitch distance of the threads 10, the rotation of the shaft produces its own axial displacement in what may be termed, as before, the positive sense, represented in Figure 6 by the distance D3. Indeed the larger worm 25 produces axial displacement only in the positive sense, from zero to some desired maximum rate.

But if the situation be reversed, and the threads 10 be engaged, as in Figures 7 and 8, with the smaller worm 26 along a circle represented at 24, 180° rotation of the shaft 1 will effect rotation of the worm 26 through the angle represented by the arrow at A6, which is appreciably more than 180°. Now thrust in the opposite sense is produced upon the shaft 1, and it is displaced axially in the negative sense by a distance represented in Figure 8 at D4, which corresponds to the excess of the angle A6 over 180° multiplied by one-half the pitch distance. The axial displacement effected by the smaller worm 26 is, then, wholly from zero to some limit displacement in the negative sense.

It follows from what has been said that here is produced an effective and infinitely variable feed device by which axial displacement of a shaft, while continuously rotating in a single rotative sense, may be effected in either a positive or in a negative axial sense. The threaded member or worm in each instance becomes a nut-like element, for it is by reason of its threaded engagement with the threads of the shaft that the axial displacement is effected. It is as truly a nut in this sense as though it encircles and embraces the shaft in the manner disclosed in my copending application Serial No. 550,811; conversely, in that case the nut is still a threaded member analogous to the threaded member 2, or 25 and 26, in this case. The principles of that application and of this are therefore identical, and only the specific mechanical form is different, yet it is desired to point out again that in the form of my copending application axial displacement can occur only in one single sense, whereas in the mechanical form herein disclosed axial displacement can be effected in each of the two opposite senses, alternatively, by suitable relative adjustments of the worm and shaft, or by selective engagement with the shaft of two different worms.

By providing a plurality of worms of different sizes relative to the shaft, alternatively engageable therewith, the axial displacement ratio can be varied at will, and the rate of axial displacement can be correspondingly varied. In any such case, care must be taken that only one worm at a time is in engagement with the shaft's threads.

I claim as my invention:

1. In combination with a screw-threaded shaft rotative normally in a single sense, a single rotative worm screw the threads whereof are complemental in pitch distance to those of the shaft, means mounting said worm screw for rotation about an axis parallel to the shaft's axis, and for displacement laterally towards and from the shaft's axis through an infinite number of positions, in all whereof the side faces of the threads of the worm screw and the shaft, respectively, are interengaged along tangent pitch circles, the combination being characterized in that the root and tip diameters of the threads of the shaft and of the worm screw, respectively, are such that the shaft and the worm screw are laterally relatively displaceable, while their threads remain interengaged and their rotation continues in the same sense, to opposite sides of that neutral position wherein the ratio of the respective pitch circles is 1:1, by displacement to one side of such neutral position to effect relative axial displacement in one sense, and by displacement to the opposite side thereof to effect relative axial displacement in the opposite sense; one of the shafts and the worm screw being resistant to axial displacement and the other being axially displaceable, and means to vary the spacing between the axes of the shaft and the worm screw to vary the ratio of their respective pitch circles, and thereby to vary accordingly the relative axial displacement of the shaft and the worm screw.

2. The combination of claim 1, wherein the worm screw is held against axial displacement, and the shaft is axially displaceable.

3. The combination of claim 1, wherein the means to vary the spacing between the axes of the shaft and the worm screw are constructed and arranged for such adjustment by infinite increments.

4. The combination of claim 1, wherein although the pitch lead of the threads of the shaft is identical with that of the threads of the worm screw, the respective pitch angles are different in correspondence with the difference in the external circumferences of their threads.

5. The combination of claim 1, wherein the threads of the shaft are square and those of the worm screw are tapered, and the latter's side faces bear against the tip diameter only of the shaft's threads, and wherein the tip diameter of the shaft's threads is intermediate the root and the tip diameters of the worm screw's threads.

6. In combination with a screw-threaded shaft rotative normally in a single sense, a worm rotative in parallelism to the shaft, the threads whereof are engageable with the threads of the shaft, one of the shafts and worm being held against axial displacement and the other being axially displaceable, and one being rotatable normally in a single sense, and by the interengagement of its threads along mutually tangent pitch circles with the threads of the other effecting rotation of such other, the threads of the worm and of the shaft being identical in pitch distance, but different in external and in root circumference, and means to adjust the one towards and from the other, to vary the relative lengths of the two mutually tangent pitch circles, of the worm and of the shaft respectively, and thereby to vary the rate of axial displacement of the axially displaceable element in accordance with such variation in the relative pitch circle lengths.

7. In combination with a screw threaded shaft having an outside diameter $D_1$ and circumference $C_1$, and a diameter $d_1$ and circumference $c_1$ at the base of its threads, said shaft being rotative normally in a single sense; a single tangent screw having an outside diameter $D_2$ and circumference $C_2$, and a diameter $d_2$ and circumference $c_2$ at the base of its threads, the shaft and the screw and their respective threads being relatively of such size that $C_2 > C_1 > c_2 > c_1$; the tangent screw being located with its axis parallel to the axis of the shaft, and spaced laterally from the shaft's axis sufficiently to engage the threads of the shaft, along a tangent pitch circle $P_1$ of constant circumference, at a point of tangency along a tangent pitch circle $P_v$ on the side faces of the threads of the screw intermediate $C_2$ and $c_2$; one of the shafts and tangent screw being resistant to axial displacement and the other being axially displaceable; and means to vary the spacing between the axes of the shaft and the tangent screw from a point wherein the length of the tangent pitch circle $P_v$ is of a given ratio to the length of $P_1$, to a point wherein the lengths of such circles are of a different ratio, thereby to vary at least the rate of relative axial displacement in accordance with such change of ratio.

8. The combination of claim 7, characterized in that the laterally relatively displaceable shaft and tangent screw are mounted for shifting both to and to either side of a neutral position wherein $P_1 = P_v$, and in such latter position produce no axial displacement, whereas when the parts are laterally displaced to make $P_1 > P_v$ the sense of axial displacement is reversed with relation to the sense thereof when the parts are laterally displaced to make $P_v > P_1$, without reversal of the sense of rotation of the shaft.

9. The combination of claim 7, wherein the bearing side faces of the screw's threads are inclined relative to the screw's axis, and the side faces of the shaft's threads are approximately normal to the shaft's axis, whereby the shaft's threads will bear always and only along the circumference $C_1$ or the equivalent tangent pitch circle $P_1$, against the radially variable tangent pitch circle $P_v$ on the inclined side faces of the screw's faces, intermediate $C_2$ and $c_2$.

10. In combination with a screw-threaded shaft rotative normally in a single sense, and also axially displaceable, a rotative worm screw the threads whereof are complemental to the threads of the shaft, the two sets of threads being interengageable at their respective side faces along tangent pitch circles, means supporting said worm screw to resist its axial displacement, and means to adjust said supporting means laterally to vary the spacing between the axes of said shaft and said worm screw in both senses from a spacing corresponding to zero displacement of the shaft, wherein the ratio between the respective pitch circles is 1:1, to effect displacement of the shaft in either axial sense according to whether the ratio between their respective pitch circles is greater or less than 1:1, so long as rotation of the shaft continues in the single sense.

WILLIAM A. BRINKHURST.

REFERENCES CITED

The following references are of record in the file of this patent:

UNITED STATES PATENTS

| Number | Name | Date |
| --- | --- | --- |
| 2,321,442 | Wilson | June 8, 1943 |
| 2,477,701 | McCallum | Aug. 2, 1949 |

FOREIGN PATENTS

| Number | Country | Date |
| --- | --- | --- |
| 8,448 | Germany | June 1, 1879 |